United States Patent
Chen

(10) Patent No.: US 9,254,782 B2
(45) Date of Patent: Feb. 9, 2016

(54) TRAFFIC SIGNAL LAMP AND CAR HAVING SAME

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 222 days.

(21) Appl. No.: 14/140,570

(22) Filed: Dec. 26, 2013

(65) Prior Publication Data

US 2015/0003091 A1    Jan. 1, 2015

(30) Foreign Application Priority Data

Jun. 27, 2013 (TW) .................................. 102122948

(51) Int. Cl.
*F21V 9/00* (2015.01)
*B60Q 1/00* (2006.01)
*F21S 8/10* (2006.01)

(52) U.S. Cl.
CPC ............ *B60Q 1/0011* (2013.01); *B60Q 1/0041* (2013.01); *F21S 48/125* (2013.01); *F21S 48/1721* (2013.01); *F21S 48/1784* (2013.01); *F21S 48/2293* (2013.01); *B60Q 2400/30* (2013.01)

(58) Field of Classification Search
CPC ............... B60Q 1/0011; B60Q 1/0041; B60Q 2400/30; F21S 48/1784; F21S 48/125; F21S 48/1721; F21S 48/1241; F21S 48/225
USPC .......................................... 362/509, 538, 511
See application file for complete search history.

(56) References Cited

U.S. PATENT DOCUMENTS

| | | | | |
|---|---|---|---|---|
| 7,097,335 | B1* | 8/2006 | Tsai | F21S 48/1784 362/321 |
| 8,690,401 | B2* | 4/2014 | Bakacha | B60Q 1/0041 362/464 |
| 9,134,474 | B2* | 9/2015 | Lindsay | F21S 48/1208 |
| 2002/0071267 | A1* | 6/2002 | Lekson | F21S 48/215 362/610 |
| 2004/0246739 | A1* | 12/2004 | Gebauer | F21S 48/1241 362/538 |
| 2005/0174792 | A1* | 8/2005 | Matsuura | B60Q 1/0011 362/511 |
| 2007/0091634 | A1* | 4/2007 | Sakurada | B60Q 1/0011 362/555 |
| 2008/0253144 | A1* | 10/2008 | Dolson | B60Q 1/0041 362/547 |
| 2009/0086500 | A1* | 4/2009 | Tatara | B60Q 1/076 362/512 |
| 2010/0195336 | A1* | 8/2010 | Hashemi | F21S 48/115 362/324 |
| 2011/0110111 | A1* | 5/2011 | Rho | F21S 48/1154 362/509 |

(Continued)

*Primary Examiner* — Anh Mai
*Assistant Examiner* — Matthew Peerce
(74) *Attorney, Agent, or Firm* — Novak Druce Connolly Bove + Quigg LLP

(57) ABSTRACT

A lamp for a moving vehicle which can function as a headlamp and as a lower-brightness running lamp includes a single light emitting device, a power regulator, a first lampshade, a light guiding element, a lifting device, and a number of first reflecting covers. The first lampshade is arranged facing the light emitting device. The light guiding element gathers light from the light source and emits the light from a lower part of the moving vehicle and the power regulator can supply full power or reduced power to the light source. The lifting device holds the light guiding element and can raise it up or down so that emitted light reaches either the first lampshade or reaches first reflecting covers depending on the lighting function required.

20 Claims, 3 Drawing Sheets

(56) References Cited

U.S. PATENT DOCUMENTS

| | | | | |
|---|---|---|---|---|
| 2011/0279007 A1* | 11/2011 | Kishimoto | B60Q 1/0011 | 313/45 |
| 2012/0106184 A1* | 5/2012 | Kishimoto | B60Q 1/0011 | 362/510 |
| 2012/0147615 A1* | 6/2012 | Singh | B60Q 1/0041 | 362/507 |
| 2012/0147616 A1* | 6/2012 | Singh | B60Q 1/0041 | 362/507 |
| 2013/0127340 A1* | 5/2013 | Huhn | B60Q 1/0041 | 315/77 |
| 2013/0141928 A1* | 6/2013 | Puente | B60Q 1/0047 | 362/487 |
| 2014/0063832 A1* | 3/2014 | Lin | B60Q 1/0035 | 362/518 |
| 2014/0169014 A1* | 6/2014 | Jungwirth | F21S 48/1154 | 362/509 |
| 2014/0321148 A1* | 10/2014 | Bauer | F21S 48/1104 | 362/516 |

* cited by examiner

TRAFFIC SIGNAL LAMP AND CAR HAVING SAME

BACKGROUND

1. Technical Field

The present disclosure relates to traffic signal lamps.

2. Description of Related Art

Motor vehicles usually include a variety of traffic signal lamps, such as a headlamp and a daytime running lamp, configured for increased visibility to other road users, and reducing a probability of traffic accident. Brightness of the headlamp is generally greater than the daytime running lamp. The daytime running lamp is mainly used during driving in bad weather, and the headlamp is used at night with no other lamps illuminated. However, the daytime running lamp and the headlamp have their own light sources, this will lead to a high cost.

Therefore, it is desirable to provide a traffic signal lamp that can overcome the above-mentioned problems.

DETAILED DESCRIPTION

Figure 1:
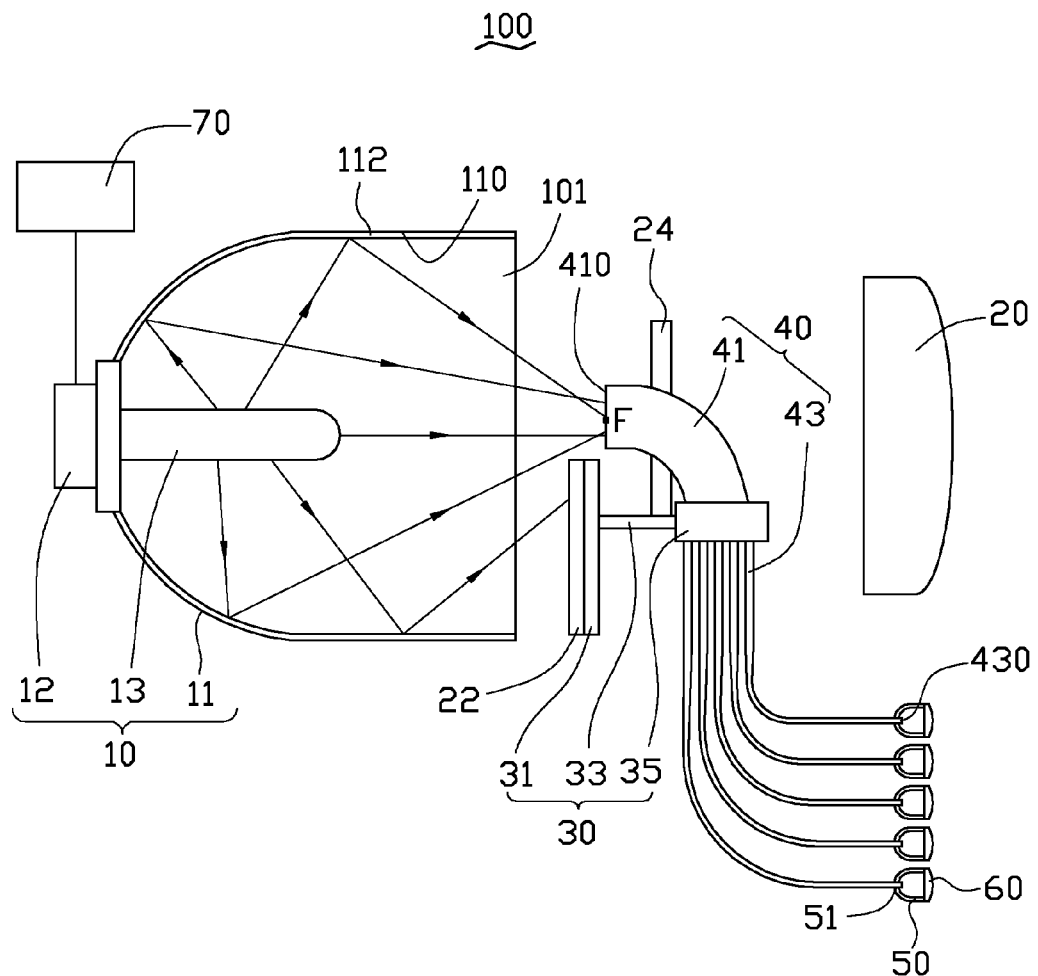
FIG. 1 is an isometric view of a traffic signal lamp according to a first embodiment working in one state.

FIG. 1 shows a traffic signal lamp 100 according to a first embodiment. The traffic signal lamp 100 functions as a daytime running lamp. The traffic signal lamp 100 includes a light emitting device 10, a first lampshade 20, a first baffle plate 22, a second baffle plate 24, a lifting device 30, a light guiding element 40, a number of first reflecting covers 50, a number of second lampshades 60, and an output power regulator 70.

The light emitting device 10 includes a second reflecting cover 11, a lamp base 12, and a light source 13. The lamp base 12 is arranged at the bottom of the second reflecting cover 11, the light source 13 is mounted on the lamp base 12. The light source 13 can be an incandescent or non-incandescent light source. In one embodiment, the light source 13 is a light bulb. The second reflecting cover 11 defines an opening 101, and light from the light source 13 is transmitted through the opening 101. The output power regulator 70 is electrically connected to the light source 13 and adjusts the power of the light source 13.

The second reflecting cover 11 includes a first inner surface 110. The first inner surface 110 is parabolic or elliptic. The first inner surface 110 is coated with a reflecting layer 112. The reflecting layer 112 is made of metal, selected from the group consisting of gold, silver, copper, aluminum, and any combination thereof. In other embodiments, the second reflecting cover 11 is made of metal, and the reflective layer 112 may be omitted. The second reflecting cover 11 defines a focal point F, and a light incident end 410 of the light guiding element 40 is located at the focus point F.

The first lampshade 20 is arranged facing the light emitting device 10, and a size of the first lampshade 20 is substantially equal to the opening 101. The first baffle plate 22 is located between the light emitting device 10 and the light guiding body 40, and the top end 220 (see FIG. 2) of the first baffle plate 22 is lower than the focal point F. The first baffle plate 22 is configured for blocking light reflected by the lower part of the second reflecting cover 11, to prevent the light from being illuminated to the upper part of the first lampshade 20.

The lifting device 30 is arranged between the light emitting device 10 and the first lampshade 20. The lifting device 30 holds the light guiding element 40 and drives the light guiding element 40 to move. More specifically, the lifting device 30 controls the light guiding element 40 to rise up or to drop, to make the light emitted from the light emitting device 10 reach either the first lampshade 20 or the second lampshades 60 selectively. The lifting device 30 includes a fixing plate 31, a connecting arm 33, and a clamp end 35, the connecting arm 33 connects the fixing plate 31 and the clamp end 35. The fixing plate 31 is arranged behind the first baffle plate 22, the connecting arm 33 is movable relative to the fixing plate 31 along the vertical direction, and the clamp end 34 fixes on the light guiding element 40. The fixing plate 31 can also function as a baffle plate, in this way, the first baffle plate 22 can be omitted.

The second baffle plate 24 is fixed on the connecting arm 33, and rotates around the connecting arm 33.

The light guide element 40 is a solid plastic pipe. The light guiding element 40 includes a light guiding body 41 and a number of light guiding branches 43 connecting with an end of the light guiding body 41. The light guiding body 41 includes the light incident end 410, each light guiding branch 43 includes a light emitting end 430, with the light incident end 410 facing the opening 101. The light emitting end 430 is opposite to the light incident end 410, and the light emitting end 430 is arranged below the light incident end 410.

Each of the first reflecting covers 50 includes a bottom opening 51, and the light emitting end 430 is inserted in the bottom opening 51. Each second lampshade 60 is matched with one of the first reflecting covers 50.

Figure 2:
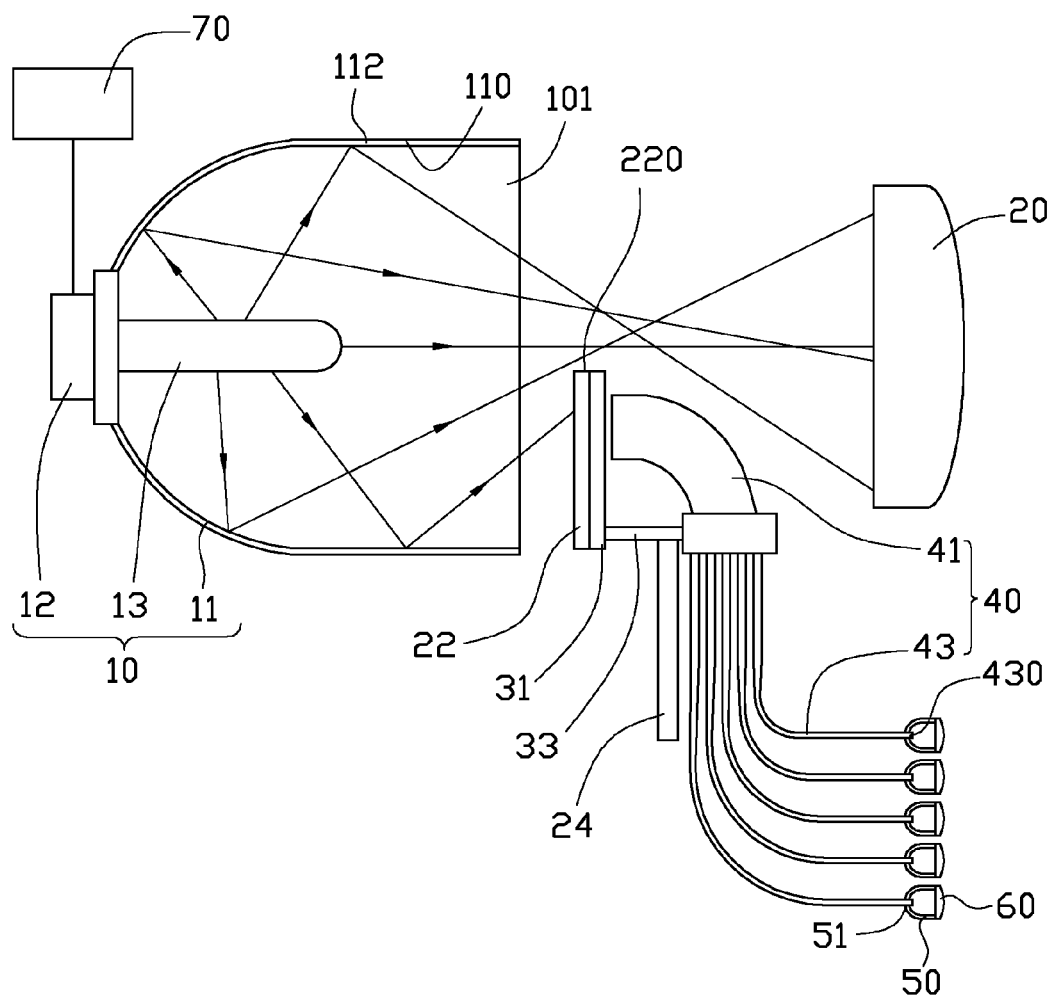
FIG. 2 is similar to FIG. 1, but shown in another state.

As shown in FIG. 1, when the traffic signal lamp 100 functions as a daytime running lamp, in order to avoid light from the emitting device 10 reaching the first lampshade 20, the second baffle plate 24 is arranged over the connecting arm 33, and light from the light emitting device 10 enters into the light guiding branches 43 and then reaches the second lampshade 60. As shown in FIG. 2, when the traffic signal lamp 100 functions as a headlamp, the second baffle plate 24 is rotated below the connecting arm 33, the lifting device 30 moves the light guiding element 40 downwards to make the light emitted by the light emitting device 10 reach only the first lampshade 20, and the brightness of the traffic signal lamp 100 is adjusted through the output power adjuster 70 to satisfy the headlamp function.

In summary, the traffic signal lamp 100 can be used as a daytime running lamp and as a headlamp, that is to say, the daytime running lamp and the headlamp share a common light emitting device, in this way, cost will be reduced.

Figure 3:
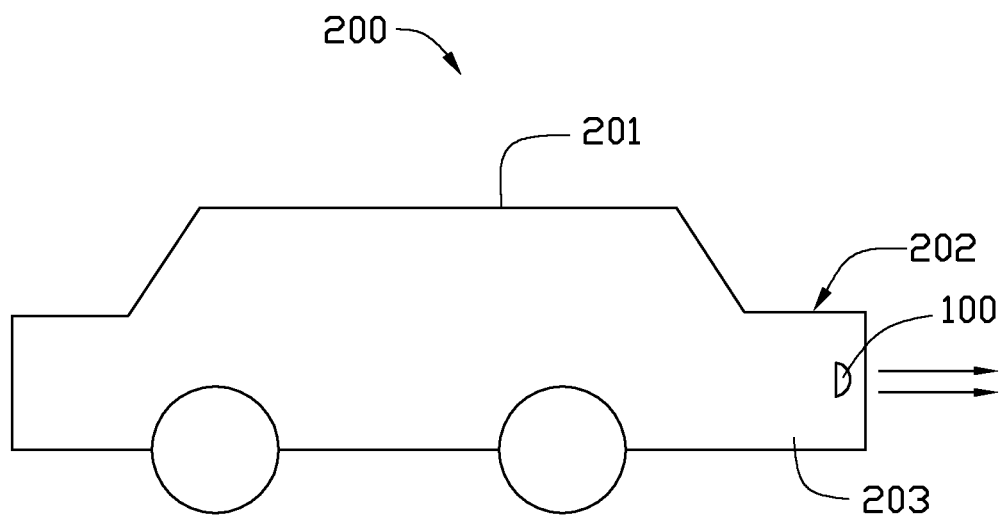
FIG. 3 is an isometric view of a moving vehicle according to a second embodiment.

FIG. 3 shows a motor vehicle 200 according to a second embodiment. The motor vehicle 200 includes a vehicle body 201 and a vehicle head 202 connecting with the vehicle body 201, the vehicle head 202 includes a first side 203 and a second side (not shown) opposite to the first side 203, the first side 203 and the second side both support a traffic signal lamp 100.

It is to be understood that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A traffic signal lamp comprising:
    a light emitting device;
    a first lampshade being arranged facing the light emitting device;
    a light guiding element comprising a light guiding body and a plurality of light guiding branches connected with the light guiding body, the light guiding body comprising a light incident end, each light guiding branch comprising a light emitting end, the light incident end facing the light emitting device, the light emitting ends opposite to the light incident end, and the light emitting ends being arranged below the light incident end;
    a lifting device being arranged between the light emitting device and the first lampshade; the lifting device being configured for clamping the light guiding element and driving the light guiding element to move;
    a plurality of first reflecting covers, each first reflecting cover comprising a bottom opening, the light emitting ends being inserted in the bottom opening, and the lifting device configured for controlling the light guiding element to rise up or drop, thereby causing light emitted from the light emitting device to reach the first lampshade or the first reflecting covers.

2. The traffic signal lamp of claim 1, wherein the light emitting device comprises a second reflecting cover, a lamp base and a light source, the lamp base is arranged at the bottom of the second reflecting cover, the light source is mounted on the lamp base.

3. The traffic signal lamp of claim 2, wherein the second reflecting cover comprises a first inner surface, the first inner surface is parabolic or elliptic.

4. The traffic signal lamp of claim 3, wherein the second reflecting cover comprises a focal point, the light incident end is located at the focal point.

5. The traffic signal lamp of claim 4, further comprising a first baffle plate, the first baffle plate located between the light emitting device and the light guiding body, and below the light incident end, the first baffle plate configured for preventing the light from illuminating the upper part of the first lampshade.

6. The traffic signal lamp of claim 5, wherein the lifting device comprises a fixing plate, a connecting arm and a clamp end, the connecting arm connecting the fixing plate and the clamp end, the fixing plate is arranged behind the first baffle plate, the connecting arm movable relative to the fixing plate along the vertical direction, and the clamp end is configured for fixing the light guiding element.

7. The traffic signal lamp of claim 6, further comprising a second baffle plate, the second baffle plate fixed on the connecting arm, and capable of rotating around the connecting arm.

8. The traffic signal lamp of claim 7, further comprising an output power regulator, wherein the output power regulator is mounted on the light emitting device, and configured for adjusting the power of the light emitting device.

9. The traffic signal lamp of claim 1, wherein the light source is a light bulb.

10. The traffic signal lamp of claim 1, further comprising a plurality of second lampshades, wherein each of the second lampshade matches with corresponding one of the first reflecting covers.

11. The traffic signal lamp of claim 1, wherein the light guide element is a solid plastic pipe.

12. A motor vehicle, comprising:
    a vehicle body;
    a vehicle head connected with the vehicle body; and
    at least one traffic signal lamp mounted on the vehicle head, each of the traffic signal lamp comprising:
        a light emitting device;
        a first lampshade being arranged facing the light emitting device;
        a light guiding element comprising a light guiding body and a plurality of light guiding branches connecting with the light guiding body, the light guiding body comprising a light incident end, each light guiding branch comprising a light emitting end, the light incident end facing the light emitting device, the light emitting ends opposite to the light incident ends, and the light emitting end being arranged below the light incident end;
        a lifting device being arranged between the light emitting device and the first lampshade; the lifting device being configured for clamping the light guiding element and driving the light guiding element to move;
        a plurality of first reflecting covers, each first reflecting cover comprising a bottom opening, the light emitting ends being inserted in the bottom opening, and the lifting device configured for controlling the light guiding element to rise up or drop, so as to cause light emitting from the light emitting device to reach the first lampshade or the first reflecting covers.

13. The motor vehicle of claim 12, wherein the light emitting device comprises a second reflecting cover, a lamp base and a light source, the lamp base is arranged at the bottom of the reflecting cover, the light source is electrically connected with the lamp base.

14. The motor vehicle of claim 13, wherein the second reflecting cover comprises a focal point, the light incident end is located at the focal point.

15. The motor vehicle of claim 12, wherein the reflecting cover comprises a first inner surface, the first inner surface is parabolic or elliptic.

16. The motor vehicle of claim 12, further comprising a first baffle plate, the first baffle plate is located between the light emitting device and the light guiding body, and below the light incident end, the first baffle plate configured for preventing the light from illuminating the upper part of the first lampshade.

17. The motor vehicle of claim 12, wherein the lifting device comprises a fixing plate, a connecting arm and a clamp end, the connecting arm connecting the fixing plate and the clamp end, the fixing plate is arranged behind the first baffle plate, the connecting arm movable relative to the fixing plate along the vertical direction, and the clamp end is configured for fixing the light guiding element.

18. The motor vehicle of claim 12, further comprising a second baffle plate, the second baffle plate fixed on the connecting arm, and capable of rotating around the connecting arm.

19. The motor vehicle of claim 12, further comprising an output power regulator, wherein the output power regulator is mounted on the light emitting device, and configured for adjusting the power of the light emitting device.

20. The motor vehicle of claim 12, further comprising a plurality of second lampshades, wherein each of the second lampshade matches with corresponding one of the first reflecting cover.

* * * * *